United States Patent
Bangala et al.

(10) Patent No.: US 11,745,591 B2
(45) Date of Patent: Sep. 5, 2023

(54) PROPULSION TORQUE DISTRIBUTION SYSTEM PROVIDING REMEDIAL ACTION

(71) Applicant: GM Global Technology Operations LLC, Detroit, MI (US)

(72) Inventors: Daniel Marius Bangala, Thornhill (CA); Yiran Hu, Shelby Township, MI (US); Sirui Song, Toronto (CA); Matthew James Meakin Brymer, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 17/329,668

(22) Filed: May 25, 2021

(65) Prior Publication Data

US 2022/0379728 A1    Dec. 1, 2022

(51) Int. Cl.
*B60L 3/00*        (2019.01)
*B60L 15/20*       (2006.01)

(52) U.S. Cl.
CPC .......... *B60L 3/0038* (2013.01); *B60L 15/20* (2013.01); *B60L 2240/16* (2013.01); *B60L 2240/18* (2013.01); *B60L 2240/24* (2013.01); *B60L 2240/423* (2013.01); *B60L 2250/26* (2013.01); *B60L 2260/28* (2013.01)

(58) Field of Classification Search
CPC .... B60L 3/0038; B60L 15/20; B60L 2240/16; B60L 2240/18; B60L 2240/24; B60L 2240/423; B60L 2250/26; B60L 2260/28; B60L 2250/28; B60L 3/0061; B60L 3/0084

See application file for complete search history.

(56) References Cited

U.S. PATENT DOCUMENTS

| | | | |
|---|---|---|---|
| 2012/0203405 A1* | 8/2012 | Wang ................... | B60W 20/50 903/902 |
| 2017/0190355 A1* | 7/2017 | Ghoneim .............. | G07C 5/0841 |
| 2019/0193569 A1* | 6/2019 | Oh .......................... | B60L 7/26 |
| 2019/0315341 A1* | 10/2019 | Ashrafi ............. | B60W 50/0225 |
| 2020/0324770 A1* | 10/2020 | Velazquez Alcantar ..................... | B60W 10/16 |

FOREIGN PATENT DOCUMENTS

DE         102017122166 A1 *    3/2018    ........... B62D 15/025

OTHER PUBLICATIONS

English translation of Patel (DE 102017122166) (Year: 2018).*

* cited by examiner

*Primary Examiner* — James M McPherson
*Assistant Examiner* — Kyle J Kingsland
(74) *Attorney, Agent, or Firm* — Vivacqua Crane, PLLC (57) ABSTRACT

A propulsion torque distribution system for a vehicle includes a controller in electronic communication with a plurality of vehicle systems. The controller executes instructions to receive at least one or more computational faults, one or more sensor faults, and a driver torque request. In response to receiving at least one of the one or more computational faults and the one or more sensor faults, the controller determines a fault that affects calculation of a primary torque request has occurred. In response to determining the fault that affects calculation of the primary torque request has occurred, the controller determines a severity of the fault. The controller determines a remedial state based on the severity of the fault. The remedial state indicates a corresponding action that is executed by the propulsion torque distribution system.

20 Claims, 5 Drawing Sheets

PROPULSION TORQUE DISTRIBUTION SYSTEM PROVIDING REMEDIAL ACTION

INTRODUCTION

The present disclosure relates to systems and methods for controlling propulsion torque distribution in a vehicle. More particularly, the present disclosure is directed towards a propulsion torque distribution system that controls the torque distribution in a vehicle and provides remedial action in response to one or more sensor faults.

In an all-wheel drive (AWD) vehicle, each tire of the vehicle may rotate at its own individual speed. For example, if the vehicle is maneuvered around a turn, the inboard tires rotate more slowly than the outboard tires. An AWD vehicle includes a main propulsion torque distribution system that determines the distribution of torque between each of the vehicle's wheels. Specifically, the main propulsion torque distribution function may influence the vehicle's longitudinal dynamics by making use of fore-aft grip on each of the vehicle's wheels. The main propulsion torque distribution function may also influence the vehicle's lateral dynamics based on torque vectoring. A torque vectoring mechanism independently distributes torque to the left and right wheels of the vehicle based on driving conditions. However, in some instances, one or more sensors that are part of the vehicle may become non-functional or a solver error may occur that adversely affects the functionality of the main propulsion torque distribution system.

Thus, while current torque distribution systems for AWD vehicles achieve their intended purpose, there is a need in the art for an improved torque distribution system that remediates sensor and solver faults. There is also a need in the art for a torque distribution system that preserves all-wheel drive capability, if possible, when sensor and solver faults occur.

SUMMARY

According to several aspects a propulsion torque distribution system for a vehicle is disclosed. The vehicle includes a plurality of torque distribution motors. The propulsion torque distribution system includes a controller in electronic communication with a plurality of vehicle systems. The controller executes instructions to receive at least one or more computational faults, one or more sensor faults, and a driver torque request, where the driver torque request indicates a total torque that a propulsion system of the vehicle is required to produce. In response to receiving at least one of the one or more computational faults and the one or more sensor faults, the controller determines a fault that affects calculation of a primary torque request has occurred, where and the primary torque request allocates the total torque between the torque distribution motors of the vehicle. In response to determining the fault that affects calculation of the primary torque request has occurred, the controller determines a severity of the fault. The controller then determines a remedial state based on the severity of the fault, where the remedial state indicates a corresponding action that is executed by the propulsion torque distribution system.

In another aspect, the controller executes instructions to classify the severity of the fault into one of a plurality of fault classifications, where the remedial state is determined based on a specific fault classification.

In yet another aspect, the controller executes instructions to classify the severity of the fault as a first fault classification that coincides with a minor fault only requiring notification to a driver of the vehicle.

In still another aspect, the controller executes instructions to classify the severity of the fault as a second fault classification that coincides with requiring an alternative sensor input for determining the primary torque request.

In one aspect, the controller executes instructions to classify the severity of the fault as a third fault classification that coincides with being unable to determine the primary torque request.

In another aspect, in response to classifying the fault as the third fault classification, the controller determines a lateral acceleration estimate and a longitudinal acceleration estimate of the vehicle based on sensor data from the plurality of vehicle systems.

In still another aspect, the controller executes instructions to compare a road wheel angle rate with a threshold wheel angle rate saved in a memory of the controller, and in response to determining the road wheel angle rate is greater than the threshold wheel angle rate, determine the vehicle is undergoing a countersteer event, and in response to determining the vehicle is undergoing a countersteer event, filter the lateral acceleration estimate.

In yet another aspect, the controller executes instructions to interpolate the lateral acceleration estimate and the longitudinal acceleration estimate to determine a base front-rear torque distribution, interpolate the lateral acceleration estimate and a vehicle reference speed to determine a speed correction offset, and combine the base front-rear torque distribution with the speed correction offset to determine a torque distribution.

In still another aspect, the controller executes instructions to multiply the torque distribution by a total driver request torque to determine a remedial torque request that is used in place of the primary torque request.

In one aspect, the driver torque request indicates the total torque that a propulsion system of the vehicle is required to produce based on a throttle pedal input.

In yet another aspect, the controller executes instructions to monitor the propulsion torque distribution system to determine when a torque transition is active, and in response to determining the torque transition has occurred, replace the primary torque request with the remedial torque request.

In still another aspect, the controller executes instructions to monitor the propulsion torque distribution system to determine when a torque transition is active, and in response to determining the torque transition is active, execute a torque blending operation.

In one aspect, the torque blending operation includes determining a fore-aft torque vectoring fraction and a left-right torque vectoring fraction for each torque distribution motor that is part of the vehicle.

In another aspect, the torque blending operation includes increasing a value of a previously calculated fore-aft torque vectoring fraction and a previously calculated left-right torque vectoring fraction stored in memory by an incremental value until the value of the previously calculated fore-aft torque vectoring fraction is equal to the fore-aft torque vectoring fraction and the previously calculated left-right torque vectoring fraction is equal to the left-right torque vectoring fraction.

In still another aspect, the controller executes instructions to classify the severity of the fault as a fourth fault classification that indicates that the primary torque request is unable to be determined.

In yet another aspect, the controller executes instructions to set a remedial torque request to a constant front-rear torque distribution and substitute the primary torque request with the remedial torque request.

In still another aspect, the controller executes instructions to classify the severity of the fault as a fifth fault classification that coincides with a fault that prevents the plurality of torque distribution motors from generating torque.

In one aspect, in response to determining the severity of the fault is classified as the fifth fault classification, the controller sets a remedial torque request to zero, where the remedial torque request is used in place of the primary torque request.

In one aspect, a non-transitory computer readable storage medium readable by a processing circuit and storing instructions that when executed by the processing circuit perform method operations including receiving at least one or more computational faults, one or more sensor faults, and a driver torque request for a vehicle, where the driver torque request indicates a total torque that a propulsion system of the vehicle is required to produce. In response to receiving at least one of the one or more computational faults and the one or more sensor faults, the method operation includes determining a fault that affects calculation of a primary torque request has occurred, where and the primary torque request allocates the total torque between the torque distribution motors of the vehicle. In response to determining the fault that affects calculation of the primary torque request has occurred, the method operation includes determining a severity of the fault. The method operation also includes determining a remedial state based on the severity of the fault, where the remedial state indicates a corresponding action that is executed by the propulsion torque distribution system.

According to several aspects, a method of operating a propulsion torque distribution system for a vehicle is disclosed, where the vehicle includes a plurality of torque distribution motors. The method includes executing instructions to receive at least one or more computational faults, one or more sensor faults, and a driver torque request, where the driver torque request indicates a total torque that a propulsion system of the vehicle is required to produce. In response to receiving at least one of the one or more computational faults and the one or more sensor faults, the method includes determining a fault that affects calculation of a primary torque request has occurred, where and the primary torque request allocates the total torque between the torque distribution motors of the vehicle. In response to determining the fault that affects calculation of the primary torque request has occurred, the method includes determines a severity of the fault. The method also includes determining a remedial state based on the severity of the fault, where the remedial state indicates a corresponding action that is executed by the propulsion torque distribution system. The method also includes classifying the severity of the fault into one of a plurality of fault classifications, where the remedial state is determined based on a specific fault classification.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
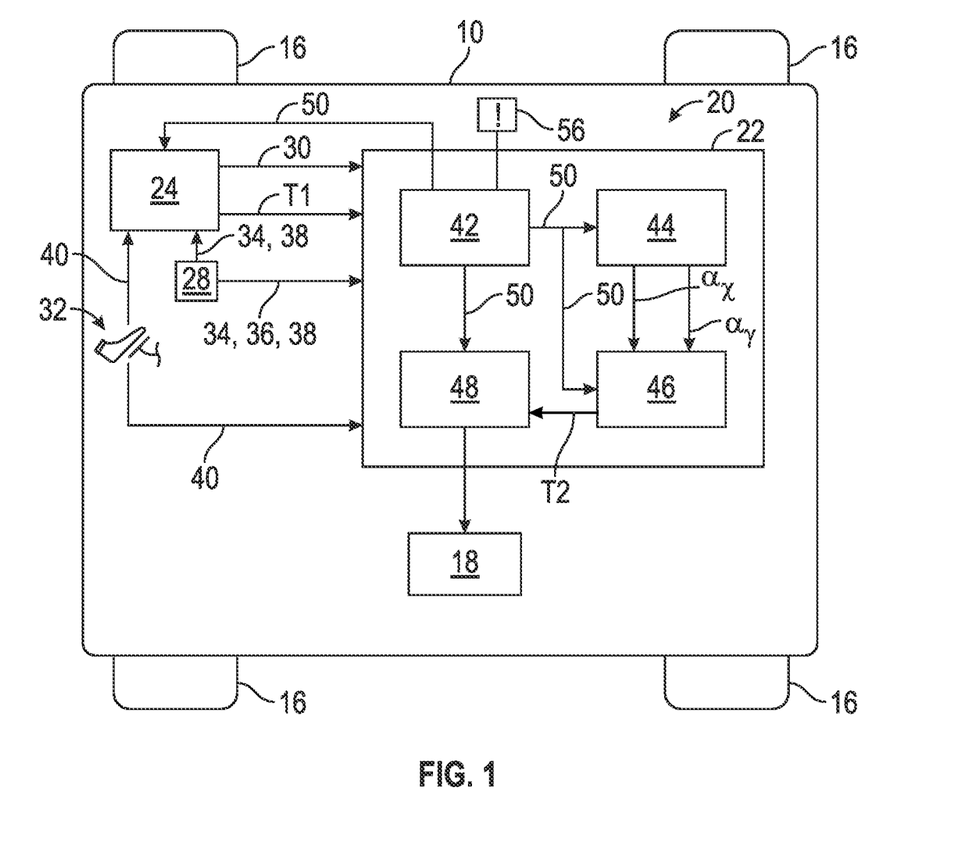
FIG. 1 is a schematic illustration of a vehicle including the disclosed propulsion torque distribution system according to an exemplary embodiment.

Referring to FIG. 1, a schematic diagram illustrating an exemplary vehicle 10 is shown. The vehicle 10 is any type of motor vehicle employing all-wheel drive (AWD) such as, but not limited to, a passenger car such as a sedan, a truck, van, or a sport-utility vehicle. The vehicle 10 includes a plurality of wheels 16 and a plurality of torque distribution motors 18 that control the torque to the wheels 16. The vehicle 10 also includes a propulsion torque distribution system 20 including a controller 22 in electronic communication with a primary vehicle motion controller 24. The primary vehicle motion controller 24 sends a primary torque request T1 to the controller 22. When applicable, the primary vehicle motion controller 24 also sends one or more computational faults 30 to the controller 22. The controller 22 of the propulsion torque distribution system 20 and the primary vehicle motion controller 24 are in electronic communication with a plurality of vehicle systems 28 and a throttle control system 32. The controller 22 receives a plurality of sensor inputs 34, one or more sensor faults 36, and vehicle dynamic inputs 38 from the plurality of vehicle systems 28 in addition to a driver torque request 40 from the throttle control system 32. The driver torque request 40 indicates a total torque that a propulsion system of the vehicle 10 is required to produce based on a throttle pedal input, and the primary torque request T1 allocates the total torque between the torque distribution motors 18 of the vehicle 10.

The primary vehicle motion controller 24 receives the plurality of sensor inputs 34 and the vehicle dynamic inputs 38 from the plurality of vehicle systems 28 and the driver torque request 40 from the throttle control system 32 input and determines the primary torque request T1 based on the input. During operation of the vehicle 10, the primary torque request T1 determined by the primary vehicle motion controller 24 is normally sent to the torque distribution motors 18. However, as explained below, in some instances when one or more computational faults 30 and/or one or more sensor faults 36 occur, a remedial torque request T2 determined by the controller 22 of the propulsion torque distribution system 20 is sent to the torque distribution motors 18 instead of the primary torque request T1, depending on the severity of the fault. Specifically, in the event there are one or more computational faults 30 and/or one or more sensor faults 36, the controller 22 of the propulsion torque distribution system 20 determines a remedial action for substituting the missing or corrupted data caused by the fault. In some embodiments where the fault is minor, the remedial action only includes providing a notification to a driver of the vehicle 10, and the primary torque request T1 continues to be sent to the torque distribution motors 18. However, in other embodiments, the remedial action includes substituting the remedial torque request T2 for the primary torque request T1. In embodiments, the propulsion torque distribution system 20 may retain all-wheel drive capability unless the fault is severe enough to prevent the plurality of torque distribution motors 18 from generating torque.

In the embodiment as shown in FIG. 1, the controller 22 includes a fault classification module 42, an acceleration estimation module 44, a remedial torque control module 46, and a torque arbitration module 48, however, it is to be appreciated that different or other modules may be included as well. The fault classification module 42 receives as input one or more computational faults 30 from the primary vehicle motion controller 24 and/or one or more sensor faults 36. The one or more computational faults 30 indicate a solver of the primary vehicle motion controller 24 is unable compute the primary torque request T1. The sensor faults 36 indicate that one or more inputs required to determine the primary torque request T1 are unavailable. In response to receiving at least one of the one or more computational faults 30 and the one or more sensor faults 36, the fault classification module 42 determines a fault that affects calculation of the primary torque request T1 has occurred. It is to be appreciated that both the primary torque request T1 and the remedial torque request T2 are expressed as an array, where each value of the array corresponds to one of the torque distribution motors 18 that are part of the vehicle 10.

In response to determining the fault that affects calculation of the primary torque request T1 has occurred, the fault classification module 42 then determines a severity of the fault. The fault classification module 42 then determines a remedial state 50 based on the severity of the fault. The remedial state 50 indicates a corresponding action that is executed by the propulsion torque distribution system 20 based on the severity of the fault. As seen in FIG. 1, the remedial state 50 is sent to the primary vehicle motion controller 24, the acceleration estimation module 44, the remedial torque control module 46, and the torque arbitration module 48. As explained below, depending on the severity of the fault, the propulsion torque distribution system 20 may substitute the primary torque request T1 that is generated by the primary vehicle motion controller 24 with the remedial torque request T2.

Figure 2:
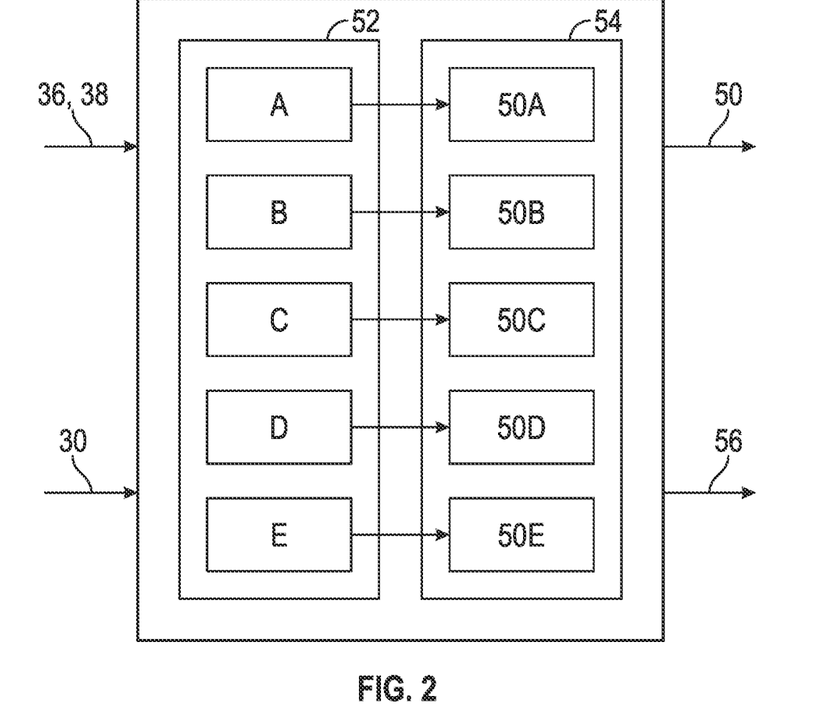
FIG. 2 is a block diagram of a fault classification module that is part of the propulsion torque distribution system shown in FIG. 1 according to an exemplary embodiment.

FIG. 2 illustrates the fault classification module 42 shown in FIG. 1. The fault classification module 42 includes a fault classification block 52 and a remedial action selection block 54. In the embodiment as shown in FIG. 2, the severity of the fault is classified by the fault classification block 52. The fault classification block 52 includes a plurality of fault classifications A, B, C, D, E. In the embodiment as shown in the figures, five fault classifications are shown, however, is to be appreciated that FIG. 2 is merely exemplary in nature and the fault classification block 52 may include any number of fault classifications. Referring to FIGS. 1 and 2, the fault classification module 42 classifies the severity of the fault into one of the plurality of fault classifications A, B, C, D, F, where the remedial state 50 is determined based on a specific fault classification. The severity of the fault may be calculated and compared to a threshold for purposes of classifying or using the fault. In other words, the severity of the fault severity may be classified based a loss function that takes some or all of the factors described below into account.

In an embodiment, the fault classification block 52 classifies the severity of the fault into the first fault classification A that coincides with a minor fault only requiring notification to a driver of the vehicle 10. That is, no corrective action is required by the propulsion torque distribution system 20 and the primary torque request T1 that is generated by the primary vehicle motion controller 24 continues to be sent to the torque distribution motors 18. One example of a first fault classification A is a faulty tire pressure sensor. The first fault classification A corresponds to a first remedial state 50A, where the first remedial state 50A includes generating a driver notification 56 indicating that one or more sensors require attention. The driver notification 56 may be any type of visual, audio, or haptic alert for alerting the driver of the vehicle 10 such as, for example, a visual indicator that lights up on the vehicle instrument panel.

In another embodiment, the fault classification block 52 classifies the severity of the fault into the second fault classification B that coincides with a fault that requires an alternative sensor input for determining the primary torque request T1. For example, if the one or more sensor faults 36 indicate a wheel speed sensor fault, then instead of relying upon wheel speed, a motor speed is used as an alternative to derive the wheel speed instead of relying directly upon the wheel speed sensor. The second fault classification B corresponds to a second remedial state 50B, where the second remedial state 50B includes determining an alternative sensor input when calculating the primary torque request T1. In an embodiment, the second remedial state 50B may also include generating the driver notification 56 as well.

A third fault classification C coincides with a fault that indicates the primary vehicle motion controller 24 is unable to determine the primary torque request T1, and therefore the remedial torque request T2 is calculated and sent to the torque distribution motors 18 in place of the primary torque request T1. One example of a third fault classification C fault is an inertial measurement unit (IMU) fault. The third classification C corresponds to a third remedial state 50C. The third remedial state 50C includes estimating a lateral acceleration estimate $a_y$ and a longitudinal acceleration estimate $a_x$ of the vehicle 10 by the acceleration estimation module 44, which is described in greater detail below, and then determining the remedial torque request T2 based on the lateral acceleration estimate $a_y$ and the longitudinal acceleration estimate $a_x$ of the vehicle 10 by the remedial torque control module 46. In an embodiment, the third remedial state 50C may also include generating the driver notification 56 as well.

In yet another embodiment, the fault classification block 52 classifies the severity of the fault into the fourth fault classification D that indicates that the primary torque request T1 is unable to be determined. One example of a fourth classification fault D is a steering angle sensor fault. In response to classifying the severity of the fault into the fourth fault classification D, the controller 22 sets the remedial torque request T2 to a constant front-rear torque distribution, and the remedial torque request T2 is calculated and sent to the torque distribution motors 18 in place of the primary torque request T1. The fourth classification D corresponds to a fourth remedial state 50D. The fourth remedial state 50D includes determining the remedial torque request T2 based on the constant front-rear torque distribution, which is described below. In an embodiment, the fourth remedial state 50D may also include generating the driver notification 56 as well.

Finally, a fifth fault classification E coincides with a fault that prevents the torque distribution motors 18 (FIG. 1) from generating torque. In response to determining the severity of the fault is classified as the fifth fault classification E, the remedial torque request T2 is set to zero and the propulsion system of the vehicle 10 is shut off. The fifth fault classification E corresponds to a fifth remedial state 50E, which includes shutting the propulsion system of the vehicle 10 off. In an embodiment, the fifth remedial state 50E may also include generating the driver notification 56 as well.

Figure 3:
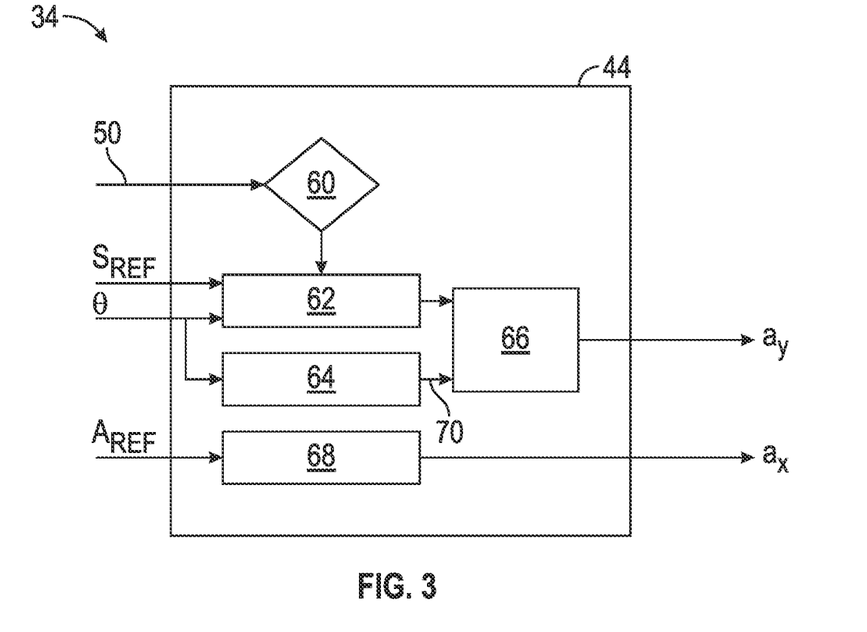
FIG. 3 is a block diagram of an acceleration estimation module that is part of the propulsion torque distribution system shown in FIG. 1 according to an exemplary embodiment.

FIG. 3 is an illustration of the acceleration estimation module 44 shown in FIG. 1. The acceleration estimation module 44 receives the remedial state 50 from the fault classification module 42 (seen in FIGS. 1 and 2) and the plurality of sensor inputs 34 from the plurality of vehicle systems 28 (FIG. 1) as input. Specifically, the acceleration estimation module 44 receives a road wheel angle $\theta$, a vehicle reference speed $S_{REF}$, and a vehicle reference acceleration $A_{REF}$ as the sensor inputs 34. As seen in FIG. 3, the acceleration estimation module 44 includes a decision block 60, a lateral acceleration block 62, a countersteer detection block 64, a filtering block 66, and a longitudinal acceleration block 68. The decision block 60 receives the remedial state 50 as input. In response to decision block 60 determining the remedial state 50 indicates the severity of the fault is classified into the third fault classification C, the acceleration estimation module 44 determines the lateral acceleration estimate $a_y$ and a longitudinal acceleration estimate $a_x$ of the vehicle 10 based on the sensor inputs 34 received from the plurality of vehicle systems 28 (shown in FIG. 1). That is, acceleration estimation module 44 only determines the lateral acceleration estimate $a_y$ and the longitudinal acceleration estimate $a_x$ of the vehicle 10 if the remedial state 50 indicates the third remedial state 50C.

The lateral acceleration block 62 receives as input the road wheel angle $\theta$ and the vehicle reference speed $S_{REF}$ as the sensor inputs 34, and estimates the lateral acceleration estimate $a_y$ based on the road wheel angle $\theta$ and the vehicle reference speed $S_{REF}$ using any known method. The road wheel angle $\theta$ is also received as input by the countersteer detection block 64. The countersteer detection block 64 compares a road wheel angle rate that indicates a rate at which a hand wheel of the vehicle 10 is turned with a threshold wheel angle rate. The threshold wheel angle rate is a pre-determined value saved in a memory of the controller 22. The countersteer detection block 64 determines the vehicle 10 is undergoing a countersteer event in response to determining the road wheel angle rate is greater than the threshold wheel angle rate. It is to be appreciated that when the vehicle 10 undergoes a countersteer event, this may adversely affect the lateral acceleration estimate $a_y$. Therefore, when the countersteer detection block 64 determines the vehicle 10 is undergoing a countersteer event, the countersteer block 64 sends a filtering signal 70 to the filtering block 66. The filtering signal 70 instructs the filtering block 66 to filter the lateral acceleration estimate $a_y$. However, once the countersteer block 64 determines the road wheel angle rate is less than the threshold wheel angle rate for a predetermined period of time, the filtering signal 70 is no longer supplied to the filtering block 66, then the filtering block 66 sends the lateral acceleration estimate $a_y$ determined by the lateral acceleration block 62.

Continuing to refer to FIG. 3, the longitudinal acceleration block 68 of the acceleration estimation module 44 determines the longitudinal acceleration estimate $a_x$ of the vehicle 10 based on the vehicle reference acceleration $A_{REF}$ based on any known method. Referring to both FIGS. 1 and 3, both the lateral acceleration estimate $a_y$ and the longitudinal acceleration estimate $a_x$ of the vehicle 10 are sent to the remedial torque control module 46 of the controller 22.

Figure 4:
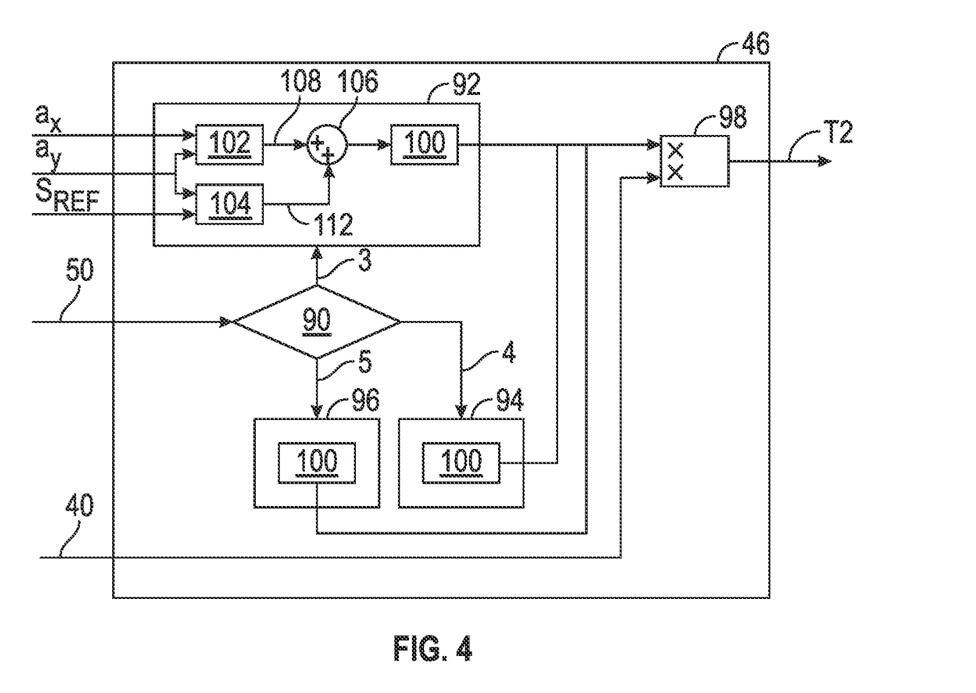
FIG. 4 is block diagram of a remedial torque control module that is part of the propulsion torque distribution system shown in FIG. 1 according to an exemplary embodiment.

Turning now to FIG. 4, the remedial torque control module 46 determines a remedial torque request T2 when the remedial state 50 indicates either the third remedial state 50C, which is indicated by reference number 3, the fourth remedial state 50D which is indicated by reference number 4, or the fifth remedial state 50E, which is indicated by reference number 5, is selected by the fault classification module 42 (shown in FIG. 1). The remedial torque control module 46 includes a decision block 90, a third remedial state block 92, a fourth remedial state block 94, a fifth remedial state block 96, and a multiplier 98. The remedial torque control module 46 receives the remedial state 50, the lateral acceleration estimate $a_y$, the longitudinal acceleration estimate $a_x$, the vehicle reference speed $S_{REF}$, and the driver torque request 40 as input. Specifically, the decision block 90 of the remedial torque control module 46 receives the remedial state 50 as input. In response to decision block 90 determining the remedial state 50 indicates the third remedial state 50C, a torque distribution 100 is determined by the third remedial state block 92.

The third remedial state block 92 includes a torque distribution block 102, a speed correction offset block 104, and an adder 106. The torque distribution block 102 receives the lateral acceleration estimate $a_y$ and the longitudinal acceleration estimate $a_x$ as input. The torque distribution block 102 interpolates the lateral acceleration estimate $a_y$ and the longitudinal acceleration estimate $a_x$ in one or more lookup tables stored in memory to determine a base front-rear torque distribution 108. The speed correction offset block 104 receives the lateral acceleration estimate $a_y$ and the vehicle reference speed $S_{REF}$. The speed correction offset block 104 interpolates the lateral acceleration estimate $a_y$ and the vehicle reference speed $S_{REF}$ in one or more look-up tables stored in memory to determine a speed correction offset 112. The adder 106 then combines the base front-rear torque distribution 108 with the speed correction offset 112 to determine the torque distribution 100. The torque distribution 100 is then multiplied by the driver request torque 40 to determine the remedial torque request T2.

Referring back to the decision block 90, in response to the decision block 90 determining the remedial state 50 indicates the fourth remedial state 50D, the torque distribution 100 is determined by the fourth remedial block 94. The fourth remedial state block 94 assigns a fixed front-rear torque distribution as the torque distribution 100. The torque distribution 100 is then multiplied by the driver request torque 40 to determine the remedial torque request T2. However, in response to the decision block 90 determining the remedial state 50 indicates the fifth remedial state 50E, the torque distribution 100 is set to zero. Thus, the remedial torque distribution T2 is zero.

Figure 5:
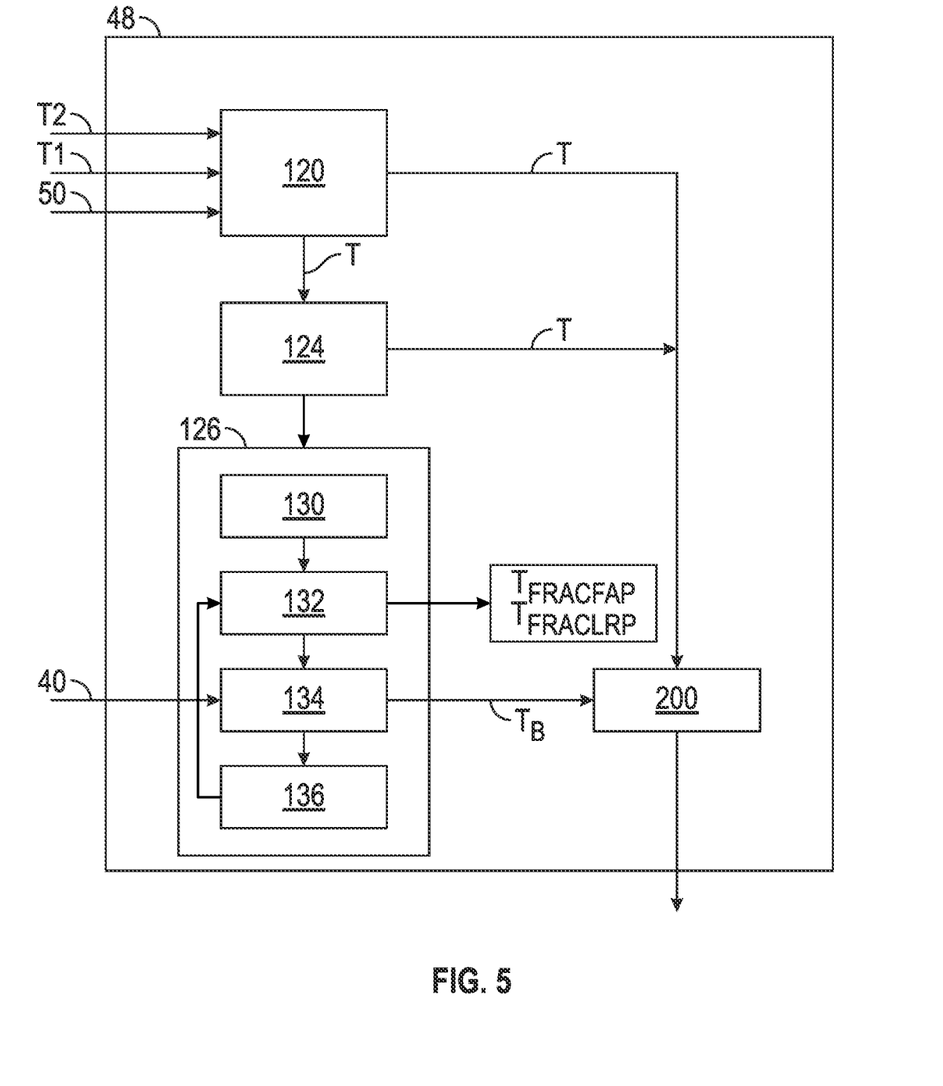
FIG. 5 is a block diagram of a torque arbitration module that is part of the propulsion torque distribution system shown in FIG. 1 according to an exemplary embodiment.

Referring now to FIG. 5, the torque arbitration module 48 is shown. The torque arbitration module 48 includes a torque selection block 120, a decision block 124, and a torque blending block 126. The torque blending block 126 includes a torque vectoring fraction block 130, a rate limit block 132, a blending block 134, and a comparison block 136. The torque arbitration module 48 receives the primary torque request T1, the driver torque request 40, the remedial state 50, and the remedial torque request T2 as input, and determines a final arbitrated torque request 200 based on the inputs. The final arbitrated torque request 200 is set to the primary torque request T1, the remedial torque request T2, or an intermediate blended torque request $T_B$, which is described below.

The torque selection block 120 receives the primary torque request T1, the remedial state 50, and the remedial torque request T2 as input, and determines a target torque request T based on the inputs. Specifically, in response to determining the remedial state 50 indicates either the first remedial state 50A or the second remedial state 50B, the torque selection block 120 selects the primary torque request T1 as the target torque request T. Thus, the primary torque request T1 is set as the final arbitrated torque request 200. However, if the remedial state 50 indicates the third remedial state 50C, the fourth remedial state 50D, or the fifth remedial state 50E, then the torque selection block 120 selects the remedial torque request T2 as the target torque request T. The torque selection block sends the target torque request T to the decision block 124.

In response to receiving the target torque request T, the decision block 124 monitors the propulsion torque distribution system 20 to determine when a torque transition has occurred. The torque transition represents the target torque request T undergoing a change in value. In response to determining the torque transition has occurred, the decision block 124 determines a torque blending operation has already been executed by the torque blending block 126, and the target torque request T is selected as the final arbitrated torque request 200. In response to determining the torque transition is active, a torque blending operation is executed by the torque blending block 126. When the torque transition is active, the propulsion torque distribution system 20 undergoes a torque blending operation for providing a transition between the target torque T and a current value of the final arbitrated torque request 200. For example, if the final arbitrated torque request 200 is set to the primary torque request T1 and target torque request T is the remedial torque request T2, then the torque blending operation may provide a smooth or gradual transition between the primary torque request T1 and the remedial torque request T2. The torque blending operation may prevent sudden sharp changes in the value of the torque request and maintains vehicle stability.

The torque blending operation includes determining a fore-aft torque vectoring fraction $T_{FRACFA}$ and left-right torque vectoring fraction $T_{FRACLR}$ for each torque distribution motor 18 (FIG. 1) that is part of the vehicle 10 by the torque vectoring fraction block 130. The fore-aft torque vectoring fraction $T_{FRACFA}$ is a difference between a total front torque and a total rear torque divided by a total torque generated by the torque distribution motors 18, and the left-right torque vectoring fraction $T_{FRACLR}$ is a difference between a left motor torque and a right motor torque divided by the total torque. For example, in an embodiment where the vehicle 10 includes a single front torque distribution motor, a left rear torque distribution motor, and a right rear torque distribution motor, then the torque vectoring fraction block 130 determines the fore-aft torque vectoring fraction $T_{FRACFA}$ and the left-right torque vectoring fraction $T_{FRACLR}$ based on Equations 1 and 2 respectively as:

$$T_{FRACFA} = \frac{T_y - T_w - T_x}{T_{TOTAL}} \qquad \text{Equation 1}$$

-continued
$$T_{FRACLR} = \frac{T_w - T_x}{T_{TOTAL}} \qquad \text{Equation 2}$$

where $T_w$ represents the left rear torque distribution motor, $T_y$ represents the right rear torque distribution motor, $T_x$ represents the single front torque distribution motor, and $T_{TOTAL}$ represents the total torque.

The torque vectoring fraction block 130 sends the fore-aft torque vectoring fraction $T_{FRACFA}$ and the left-right torque vectoring fraction $T_{FRACLR}$ to the rate limit block 132. A previously calculated fore-aft torque vectoring fraction $T_{FRACFAP}$ and a previously calculated left-right torque vectoring fraction $T_{FRACLRP}$ that were determined in a previous cycle are stored in memory of the controller 22 and are sent to the rate limit block 132. The rate limit block 132 increases a value of the previously calculated fore-aft torque vectoring fraction $T_{FRACFAP}$ and the previously calculated left-right torque vectoring fraction $T_{FRACLRP}$ by an incremental value to determine the intermediate blended torque request $T_B$. The incremental value may be a constant value or, in the alternative, a dynamic value. The intermediate blended torque request $T_B$ is set as the final arbitrated torque request 200. The intermediate blended torque request $T_B$ is also sent to the comparison block 136. The comparison block 136 compares the intermediate blended torque request $T_B$ with the target torque request T. In response to determining the intermediate blended torque request $T_B$ is not equal to the target torque request T, the comparison block 136 instructs the rate limit block 132 to continue increasing the value of the of the previously calculated fore-aft torque vectoring fraction $T_{FRACFAP}$ and the previously calculated left-right torque vectoring fraction $T_{FRACLRP}$. However, in response to determining the intermediate blended torque request $T_B$ is equal to the target torque request T, the comparison block 136 instructs the torque blending block 126 to cease executing the torque blending operation, and the target torque request T is set as the final arbitrated torque request 200.

Referring generally to the figures, the disclosed propulsive torque distribution system provides various technical effects and benefits to a vehicle. Specifically, the disclosed propulsive torque distribution system classifies the sensor faults into categories based on their impact to the main propulsion torque control. Depending upon the severity of the fault, the propulsive torque distribution system also retains all-wheel drive for the vehicle. The disclosure also provides an approach for substituting data in the event one or more sensor faults occur in order to retain all-wheel drive capability in a vehicle based on the severity of the fault. Furthermore, the disclosure also provides an approach for smoothly transitioning the torque distribution from the primary control to the remedial control while still maintaining vehicle stability and throttle response.

Figure 6:
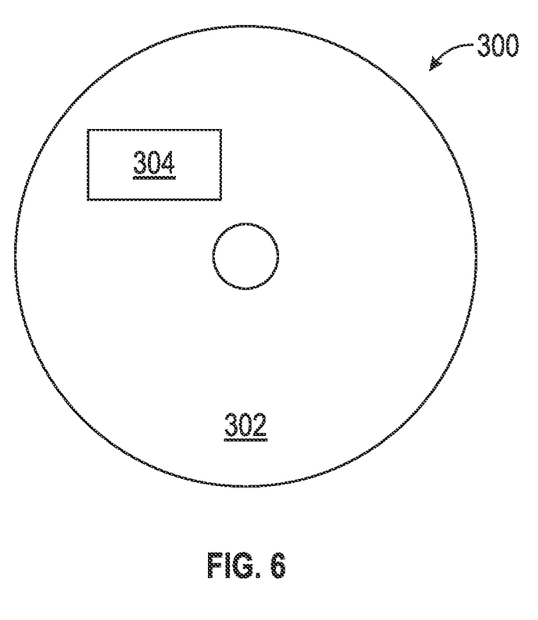
FIG. 6 illustrates a computer program product including one or more storage media, according to an exemplary embodiment.

Referring now to FIG. 6, a computer program product 300 includes one or more non-transitory computer readable storage mediums 302. The storage medium 302 stores computer readable program code or logic 304 thereon to provide and facilitate one or more aspects of embodiments described herein. The program code or logic is created using a compiler or assembler for example, to assemble instructions, that, when executed perform aspects of embodiments. The program code, when created and stored on a tangible medium, is referred to as a computer readable medium. Some examples of a computer readable medium include, but are not limited to, electronic memory modules (RAM), flash memory, and compact discs (CDs). The computer program product medium is readable by a processing circuit in a computer system for execution by a processing circuit.

The controllers 22, 24 shown in FIG. 1 may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers 22, 24 may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A propulsion torque distribution system for a vehicle, wherein the vehicle includes a plurality of torque distribution motors, the propulsion torque distribution system comprising:
    a controller in electronic communication with a plurality of vehicle systems, wherein the controller executes instructions to:
        receive at least one of the following: one or more computational faults and one or more sensor faults in combination with a driver torque request, wherein the driver torque request indicates a total torque that a propulsion system of the vehicle is required to produce;
        in response to receiving at least one of the one or more computational faults and the one or more sensor faults, determine a fault that affects calculation of a primary torque request has occurred, wherein and the primary torque request allocates the total torque between the torque distribution motors of the vehicle;
        in response to determining the fault that affects calculation of the primary torque request has occurred, determine a severity of the fault;
        determine a remedial state based on the severity of the fault, wherein the remedial state indicates a corresponding action that is executed by the propulsion torque distribution system;
        classify the severity of the fault into one of a plurality of fault classifications, wherein the remedial state is determined based on a specific fault classification, and wherein the propulsion torque distribution system retains an all-wheel drive capability of the vehicle based on the severity of the fault, wherein the fault is classified as a third fault classification that coincides with being unable to determine the primary torque request; and
        in response to classifying the fault as the third fault classification, determine a lateral acceleration estimate and a longitudinal acceleration estimate of the vehicle based on sensor data from the plurality of vehicle systems.

2. The propulsion torque distribution system of claim 1, wherein the controller executes instructions to:
    classify the severity of the fault as a first fault classification that coincides with a minor fault only requiring notification to a driver of the vehicle, wherein the minor fault requires no corrective action by the propulsion torque distribution system.

3. The propulsion torque distribution system of claim 1, wherein the controller executes instructions to:
    classify the severity of the fault as a second fault classification that coincides with requiring an alternative sensor input for determining the primary torque request.

4. The propulsion torque distribution system of claim 1, wherein the controller executes instructions to:
    compare a road wheel angle rate with a threshold wheel angle rate saved in a memory of the controller;
    in response to determining the road wheel angle rate is greater than the threshold wheel angle rate, determine the vehicle is undergoing a countersteer event; and
    in response to determining the vehicle is undergoing a countersteer event, filter the lateral acceleration estimate.

5. The propulsion torque distribution system of claim 4, wherein the controller executes instructions to:
    interpolate the lateral acceleration estimate and the longitudinal acceleration estimate to determine a base front-rear torque distribution;
    interpolate the lateral acceleration estimate and a vehicle reference speed to determine a speed correction offset; and
    combine the base front-rear torque distribution with the speed correction offset to determine a torque distribution.

6. The propulsion torque distribution system of claim 5, wherein the controller executes instructions to:
    multiply the torque distribution by a total driver torque request to determine a remedial torque request that is used in place of the primary torque request.

7. The propulsion torque distribution system of claim 6, wherein the driver torque request indicates the total torque that a propulsion system of the vehicle is required to produce based on a throttle pedal input.

8. The propulsion torque distribution system of claim 6, wherein the controller executes instructions to:
    monitor the propulsion torque distribution system to determine when a torque transition is active; and
    in response to determining the torque transition has occurred, replace the primary torque request with the remedial torque request.

9. The propulsion torque distribution system of claim 6, wherein the controller executes instructions to:
    monitor the propulsion torque distribution system to determine when a torque transition is active; and
    in response to determining the torque transition is active, execute a torque blending operation.

10. The propulsion torque distribution system of claim 9, wherein the torque blending operation includes:
    determining a fore-aft torque vectoring fraction and a left-right torque vectoring fraction for each torque distribution motor that is part of the vehicle.

11. The propulsion torque distribution system of claim 10, wherein the torque blending operation includes:
    increasing a value of a previously calculated fore-aft torque vectoring fraction and a previously calculated left-right torque vectoring fraction stored in memory by an incremental value until the value of the previously calculated fore-aft torque vectoring fraction is equal to the fore-aft torque vectoring fraction and the previously calculated left-right torque vectoring fraction is equal to the left-right torque vectoring fraction.

12. The propulsion torque distribution system of claim 1, wherein the controller executes instructions to:
classify the severity of the fault as a fourth fault classification that indicates that the primary torque request is unable to be determined.

13. The propulsion torque distribution system of claim 12, wherein the controller executes instructions to:
set a remedial torque request to a constant front-rear torque distribution; and
substitute the primary torque request with the remedial torque request.

14. The propulsion torque distribution system of claim 1, wherein the controller executes instructions to:
classify the severity of the fault as a fifth fault classification that coincides with a fault that prevents the plurality of torque distribution motors from generating torque.

15. The propulsion torque distribution system of claim 14, wherein the controller further executes instructions to:
in response to determining the severity of the fault is classified as the fifth fault classification, set a remedial torque request to zero, wherein the remedial torque request is used in place of the primary torque request.

16. A non-transitory computer readable storage medium readable by a processing circuit and storing instructions that when executed by the processing circuit perform method operations, comprising:
receiving at least one of the following: one or more computational faults and one or more sensor faults in combination with a driver torque request for a vehicle, wherein the driver torque request indicates a total torque that a propulsion system of the vehicle is required to produce;
in response to receiving at least one of the one or more computational faults and the one or more sensor faults, determining a fault that affects calculation of a primary torque request has occurred, wherein and the primary torque request allocates the total torque between a plurality of torque distribution motors of the vehicle;
in response to determining the fault that affects calculation of the primary torque request has occurred, determining a severity of the fault;
determining a remedial state based on the severity of the fault, wherein the remedial state indicates a corresponding action that is executed by a propulsion torque distribution system;
classifying the severity of the fault into one of a plurality of fault classifications, wherein the remedial state is determined based on a specific fault classification, and wherein the propulsion torque distribution system retains an all-wheel drive capability of the vehicle based on the severity of the fault, wherein the fault is classified as a third fault classification that coincides with being unable to determine the primary torque request; and
in response to classifying the fault as the third fault classification, determining a lateral acceleration estimate and a longitudinal acceleration estimate of the vehicle based on sensor data from a plurality of vehicle systems.

17. A method of operating a propulsion torque distribution system for a vehicle including a plurality of torque distribution motors, the method comprising:
receiving, by a controller, at least one of the following: one or more computational faults and one or more sensor faults in combination with a driver torque request, wherein the driver torque request indicates a total torque that a propulsion system of the vehicle is required to produce;
in response to receiving at least one of the one or more computational faults and the one or more sensor faults, determining a fault that affects calculation of a primary torque request has occurred, wherein and the primary torque request allocates the total torque between the torque distribution motors of the vehicle;
in response to determining the fault that affects calculation of the primary torque request has occurred, determining a severity of the fault;
determining a remedial state based on the severity of the fault, wherein the remedial state indicates a corresponding action that is executed by the propulsion torque distribution system;
classifying the severity of the fault into one of a plurality of fault classifications, wherein the remedial state is determined based on a specific fault classification, and wherein the propulsion torque distribution system retains an all-wheel drive capability of the vehicle based on the severity of the fault, wherein the fault is classified as a third fault classification that coincides with being unable to determine the primary torque request; and
in response to classifying the fault as the third fault classification, determining a lateral acceleration estimate and a longitudinal acceleration estimate of the vehicle based on sensor data from the plurality of vehicle systems.

18. The non-transitory computer readable storage medium of claim 16, wherein the method operations comprise:
classifying the severity of the fault as a first fault classification that coincides with a minor fault only requiring notification to a driver of the vehicle, wherein the minor fault requires no corrective action by the propulsion torque distribution system.

19. The non-transitory computer readable storage medium of claim 16, wherein the method operations comprise:
classifying the severity of the fault as a second fault classification that coincides with requiring an alternative sensor input for determining the primary torque request.

20. The non-transitory computer readable storage medium of claim 16, wherein the method operations comprise:
comparing a road wheel angle rate with a threshold wheel angle rate saved in the non-transitory computer readable storage medium;
in response to determining the road wheel angle rate is greater than the threshold wheel angle rate, determining the vehicle is undergoing a countersteer event; and
in response to determining the vehicle is undergoing a countersteer event, filtering the lateral acceleration estimate.

* * * * *